US010865548B2

(12) United States Patent
Ozburn

(10) Patent No.: US 10,865,548 B2
(45) Date of Patent: Dec. 15, 2020

(54) PROTECTIVE DEVICES, SILICONE SLEEVES AND RELATED SYSTEMS

(71) Applicant: Albert Glenn Ozburn, Oxford, GA (US)

(72) Inventor: Albert Glenn Ozburn, Oxford, GA (US)

( * ) Notice: Subject to any disclaimer, the term of this patent is extended or adjusted under 35 U.S.C. 154(b) by 0 days.

(21) Appl. No.: 16/042,420

(22) Filed: Jul. 23, 2018

(65) Prior Publication Data
US 2019/0024352 A1 Jan. 24, 2019

Related U.S. Application Data

(60) Provisional application No. 62/535,531, filed on Jul. 21, 2017, provisional application No. 62/617,776, filed on Jan. 16, 2018.

(51) Int. Cl.
| | |
|---|---|
| *E03B 9/06* | (2006.01) |
| *E04H 17/00* | (2006.01) |
| *A62C 35/20* | (2006.01) |
| *F16K 27/12* | (2006.01) |
| *F16B 4/00* | (2006.01) |

(52) U.S. Cl.
CPC ............... *E03B 9/06* (2013.01); *A62C 35/20* (2013.01); *E04H 2017/006* (2013.01); *F16B 4/004* (2013.01); *F16K 27/12* (2013.01)

(58) Field of Classification Search
CPC .............................. E03B 9/06; Y10T 137/5468
See application file for complete search history.

(56) References Cited

U.S. PATENT DOCUMENTS

| | | | | |
|---|---|---|---|---|
| 4,398,556 | A * | 8/1983 | Pereira | E03B 9/02 |
| | | | | 137/296 |
| 4,727,900 | A * | 3/1988 | Dooling | E03B 9/06 |
| | | | | 137/296 |
| D347,467 | S | 5/1994 | Medvick | |
| D379,493 | S | 5/1997 | Woods | |
| D382,943 | S | 8/1997 | Doughty et al. | |
| D386,246 | S | 11/1997 | Sonden et al. | |
| 6,536,462 | B1 * | 3/2003 | Laugen | E03B 9/06 |
| | | | | 137/15.17 |
| D473,934 | S | 4/2003 | Singtoroj | |

(Continued)

OTHER PUBLICATIONS

Notice of Allowance corresponding to U.S. Appl. No. 29/657,496 dated Sep. 20, 2019.

(Continued)

*Primary Examiner* — Kevin R Barss
(74) *Attorney, Agent, or Firm* — Jenkins, Wilson, Taylor & Hunt, P.A.

(57) ABSTRACT

A fire hydrant bonnet cover made of an elastic flexible material component formed in a shape substantially similar to a bonnet portion of a fire hydrant, and including a predetermined color associated with an identifying characteristic of the fire hydrant to which it is to be applied, and a reflective material applied to or integrated into the elastic flexible material component. Such fire hydrant bonnet covers can comprise an upper portion made in a shape of the bonnet of the fire hydrant, and a lower portion defining a cylindrical structure with a lip at a bottom edge of the lower portion to hold the elastic flexible material component onto the bonnet of the fire hydrant.

15 Claims, 11 Drawing Sheets

(56) References Cited

U.S. PATENT DOCUMENTS

| | | | |
|---|---|---|---|
| 6,935,360 B2 * | 8/2005 | Knappmiller | F16K 27/12 |
| | | | 137/296 |
| D554,974 S | 11/2007 | Huang | |
| D572,348 S | 7/2008 | Arosio | |
| D613,828 S | 4/2010 | Kinchen | |
| D679,171 S | 4/2013 | Sedwick | |
| 8,657,021 B1 * | 2/2014 | Preta | A62C 37/50 |
| | | | 169/54 |
| D700,682 S | 3/2014 | Bayyouk et al. | |
| D748,228 S | 1/2016 | Bayyouk et al. | |
| D787,029 S | 5/2017 | Bayyouk et al. | |
| D873,967 S | 1/2020 | Ozburn | |
| 2010/0295672 A1 * | 11/2010 | Hyland | H04Q 9/00 |
| | | | 340/539.1 |
| 2012/0261002 A1 * | 10/2012 | Sampson | E03B 9/04 |
| | | | 137/296 |

OTHER PUBLICATIONS

Notice of Allowability corresponding to U.S. Appl. No. 29/657,496 dated Dec. 11, 2019.

* cited by examiner

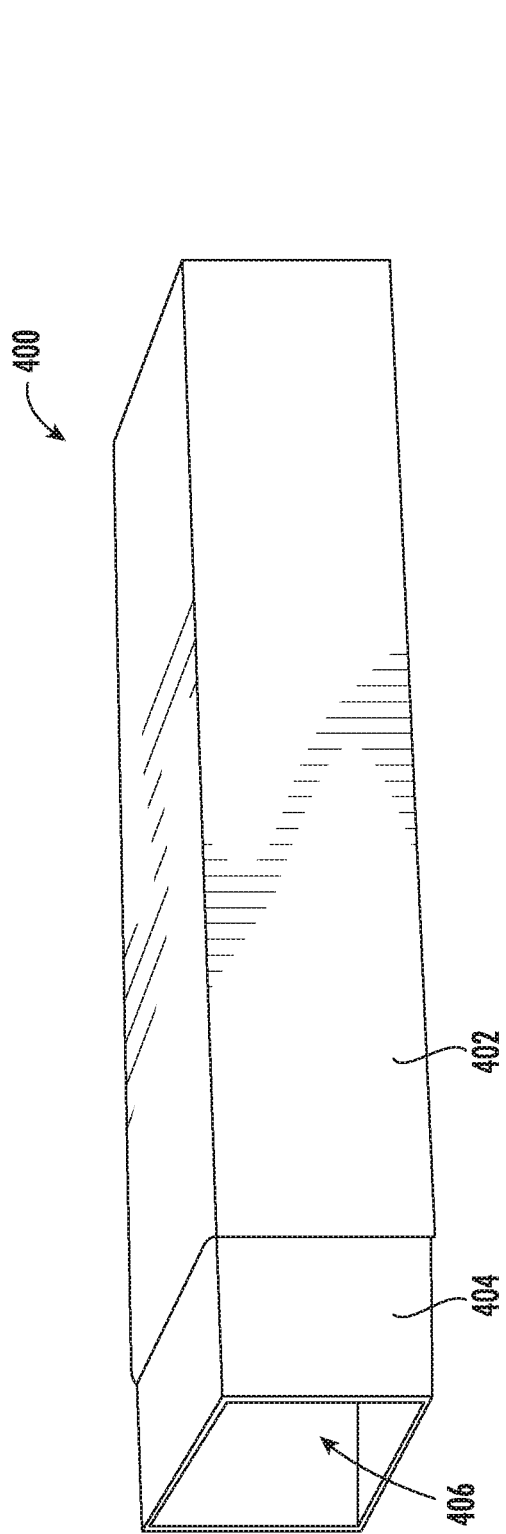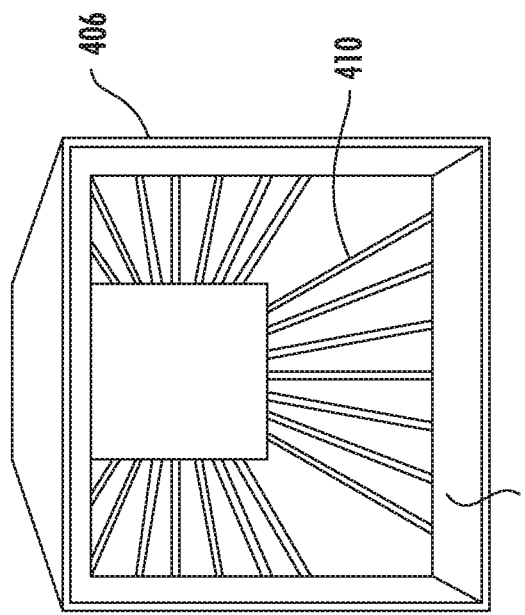
FIG. 4A
FIG. 4B

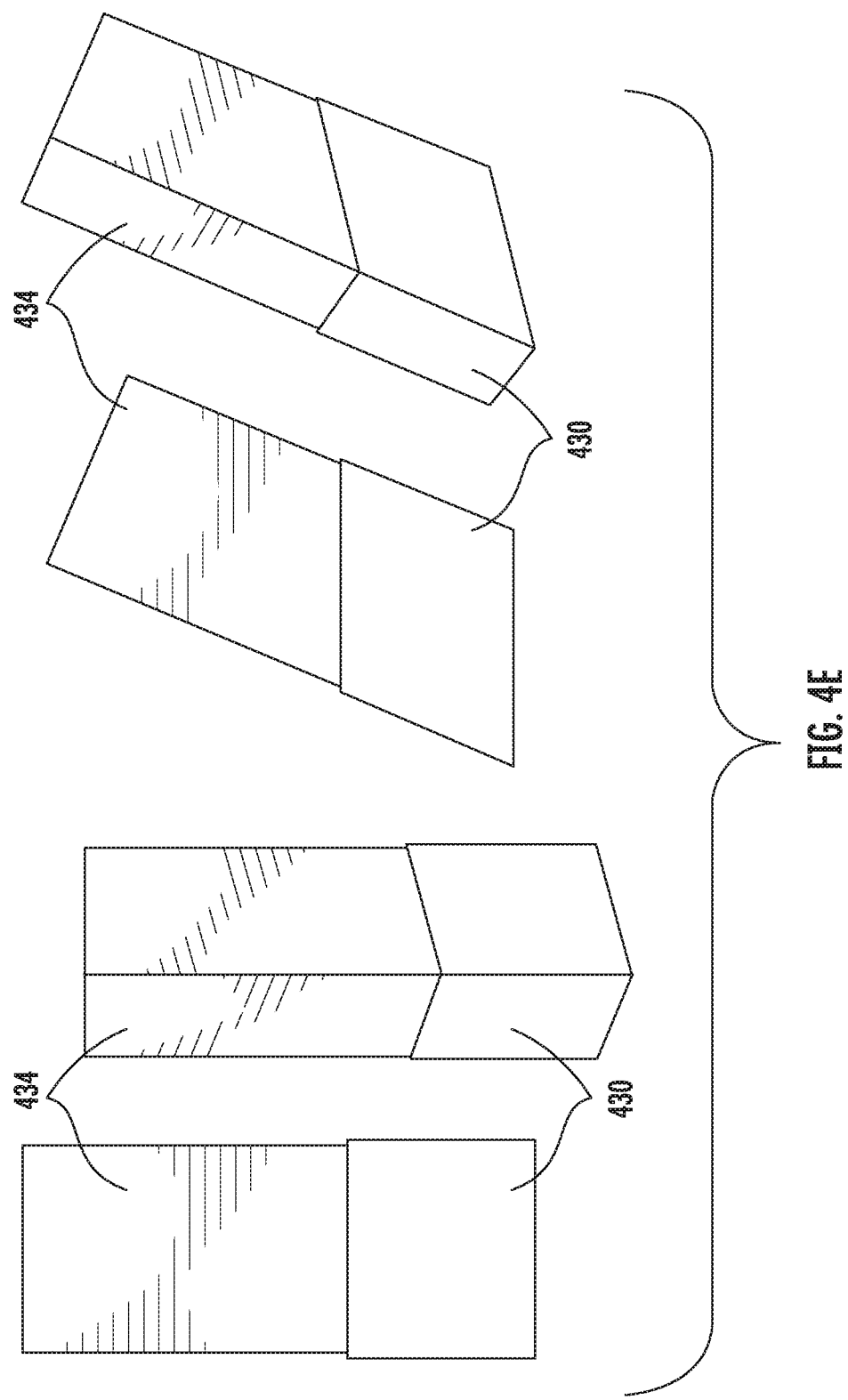

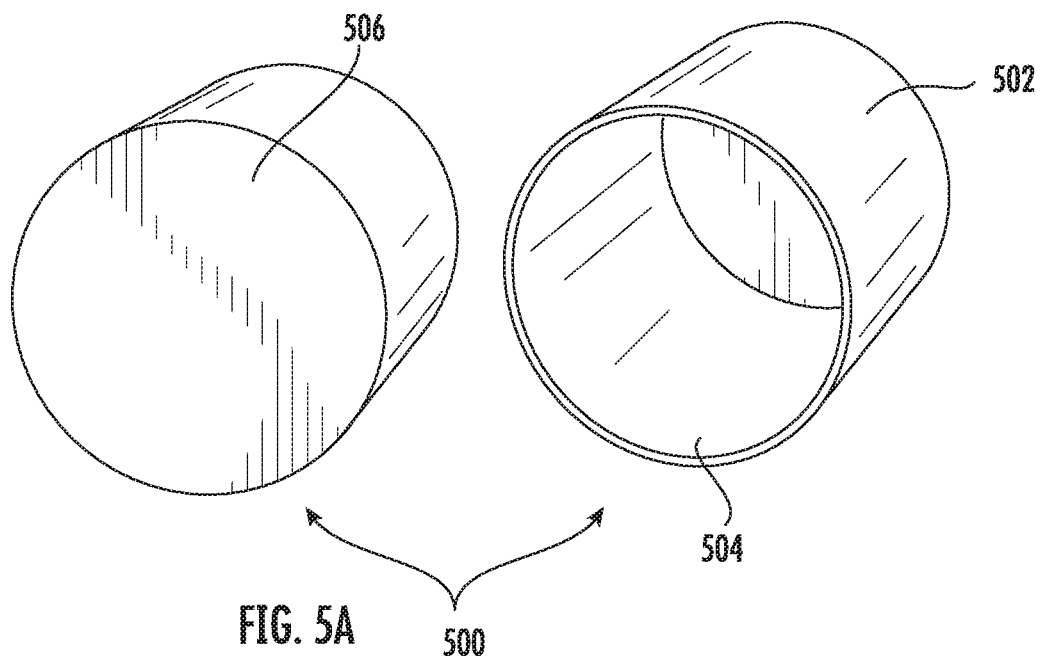
FIG. 5A
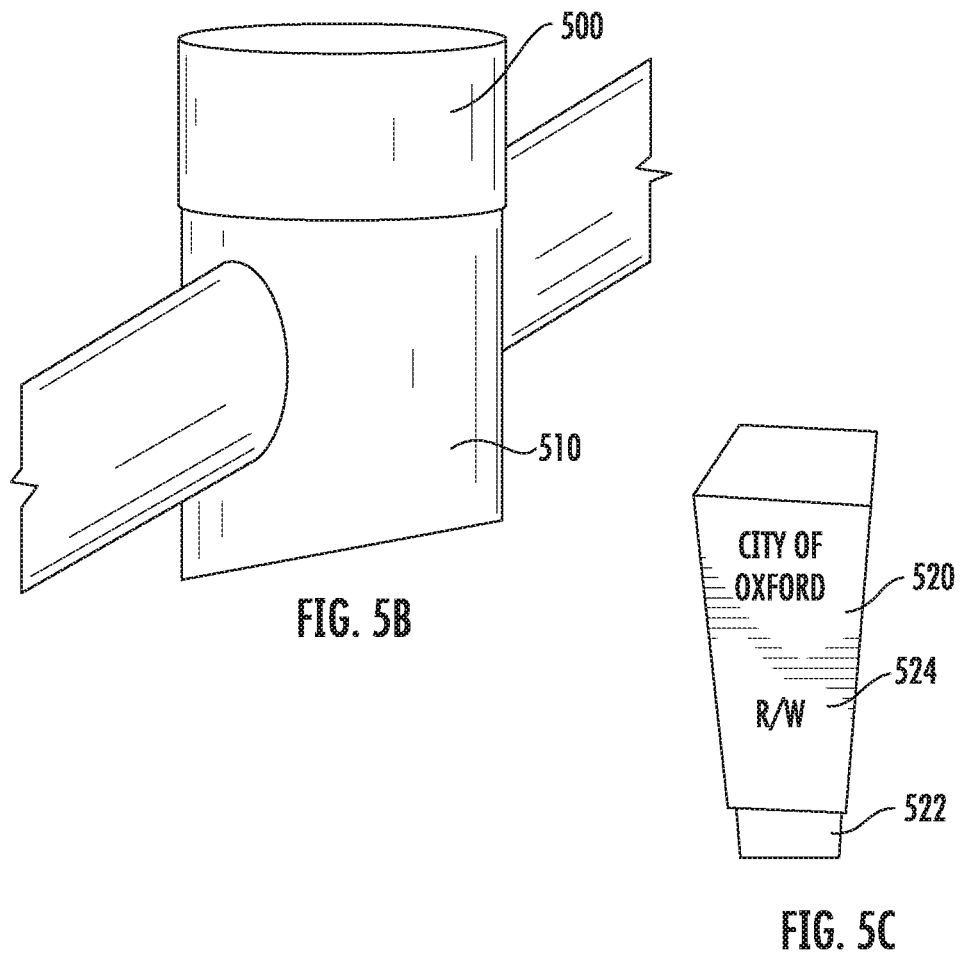
FIG. 5B
FIG. 5C

PROTECTIVE DEVICES, SILICONE SLEEVES AND RELATED SYSTEMS

CROSS-REFERENCE TO RELATED APPLICATIONS

This application claims benefit of U.S. Provisional Patent Application Ser. No. 62/535,531, filed Jul. 21, 2017, and U.S. Provisional Patent Application Ser. No. 62/617,776, filed Jan. 16, 2018, herein incorporated by reference in their entireties.

TECHNICAL FIELD

The subject matter herein generally relates to the field of elastic covers, protective sleeves, silicone end caps and related systems. The subject matter herein more particularly relates to elastic covering devices used to protect building materials from premature degradation and provide enhanced visibility and identification of fire hydrants.

BACKGROUND

It is a common problem that building materials experience premature degradation when exposed to environmental conditions, whether from moisture, pests, or otherwise. While this issue is not encountered for all building materials in every instance, it is especially pervasive for building materials that will come into contact with, or be immersed in, soil or other moist environments (e.g., exposed to rain). While polyvinyl chloride (PVC) is used in some instances where exposure to moisture or other environmental degradation factors, PVC is not a suitable building material in many applications (e.g., load-bearing applications). Among the building materials that are susceptible to degradation from exposure to moisture are wood, concrete, and ferrous metals (e.g., steel). Each of these types of building materials are commonly used in positions where they will be in contact with, or buried at least partially in, soil, such that these building materials will be almost constantly exposed to moisture throughout their installed life.

As such, a need exists for protecting the portion of such building materials that is commonly exposed to moisture when installed in a moist environment.

Another common problem that exists is the environmental degradation of the exposed surfaces of fire hydrants. Beginning in 2016, the National Fire Protection Association (NFPA) issued code 291, titled "Recommended Practice for Fire Flow Testing and Marking of Hydrants." NFPA 291 provides guidance on fire flow tests and marking of hydrants in order to determine and indicate the relative available fire service water supply from hydrants and to identify possible deficiencies which could be corrected to ensure adequate water flow rates as needed. While it is commonplace at present for fire hydrants to have different colors in various municipalities, eventually all municipalities and government installations will have to abide by this code. NFPA 291 states that all fire hydrants using public water supply systems should be painted chrome yellow, and their tops and caps should be color-coded to indicate the available GPM at a given fire hydrant. For fire hydrants that can provide less than 500 GPM, the tops and caps should be marked in red, fire hydrants that can provide between 500-999 GPM should be marked in orange, fire hydrants that can provide between 1000-1499 GPM should be marked in green, and fire hydrants that can provide between 1500 GPM or more should be marked in blue. However, traditional fire hydrant markings, regardless of color, are typically some form of paint, which is subject to degradation from ultraviolet light, moisture, dirt and debris, and the like, requiring periodic reapplication of the desired color paint.

As such, a need exists for a durable and protective fire hydrant cover that readily identifies pertinent information relating to the fire hydrant, including the flow rate available at each.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

A protective covering device is provided for covering at least part of a structure, the device has a solid bottom surface, at least one lateral side portion extending upwards from the bottom surface, and an open top portion, wherein the device is an elastic flexible material.

A device is provided for protecting an upper portion of a fire hydrant, the device having a first portion in a shape of a cap of a fire hydrant and a lip at a bottom edge of the first portion, wherein the device is an elastic flexible material.

In some aspects, provided herein are fire hydrant bonnet covers comprising an elastic flexible material component formed in a shape substantially similar to a bonnet portion of a fire hydrant, a predetermined color associated with an identifying characteristic of the fire hydrant to which it is to be applied, and a reflective material applied to or integrated into the elastic flexible material component, wherein the elastic flexible material component comprising, an upper portion comprising a shape of the bonnet of the fire hydrant, and a lower portion defining a cylindrical structure with a lip at a bottom edge of the lower portion, wherein the lip is configured to hold the elastic flexible material component onto the bonnet of the fire hydrant.

Although some of the aspects of the subject matter disclosed herein have been stated hereinabove, and which are achieved in whole or in part by the presently disclosed subject matter, other aspects will become evident as the description proceeds, when taken in connection with the accompanying drawings as best described hereinbelow.

Accordingly, it is an object of the presently disclosed subject matter to provide protective covering and identification devices for application on fire hydrants and other objects. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description, Drawings and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which:

FIGS. 4A through 4E show further example embodiments and features of pliable protective elastic covering devices, and exemplary applications thereof, in accordance with the disclosure herein; and FIGS. 5A through 5C show further example embodiments and features of pliable protective elastic covering devices, and exemplary applications thereof, in accordance with the disclosure herein.

DETAILED DESCRIPTION

Figure 1A:
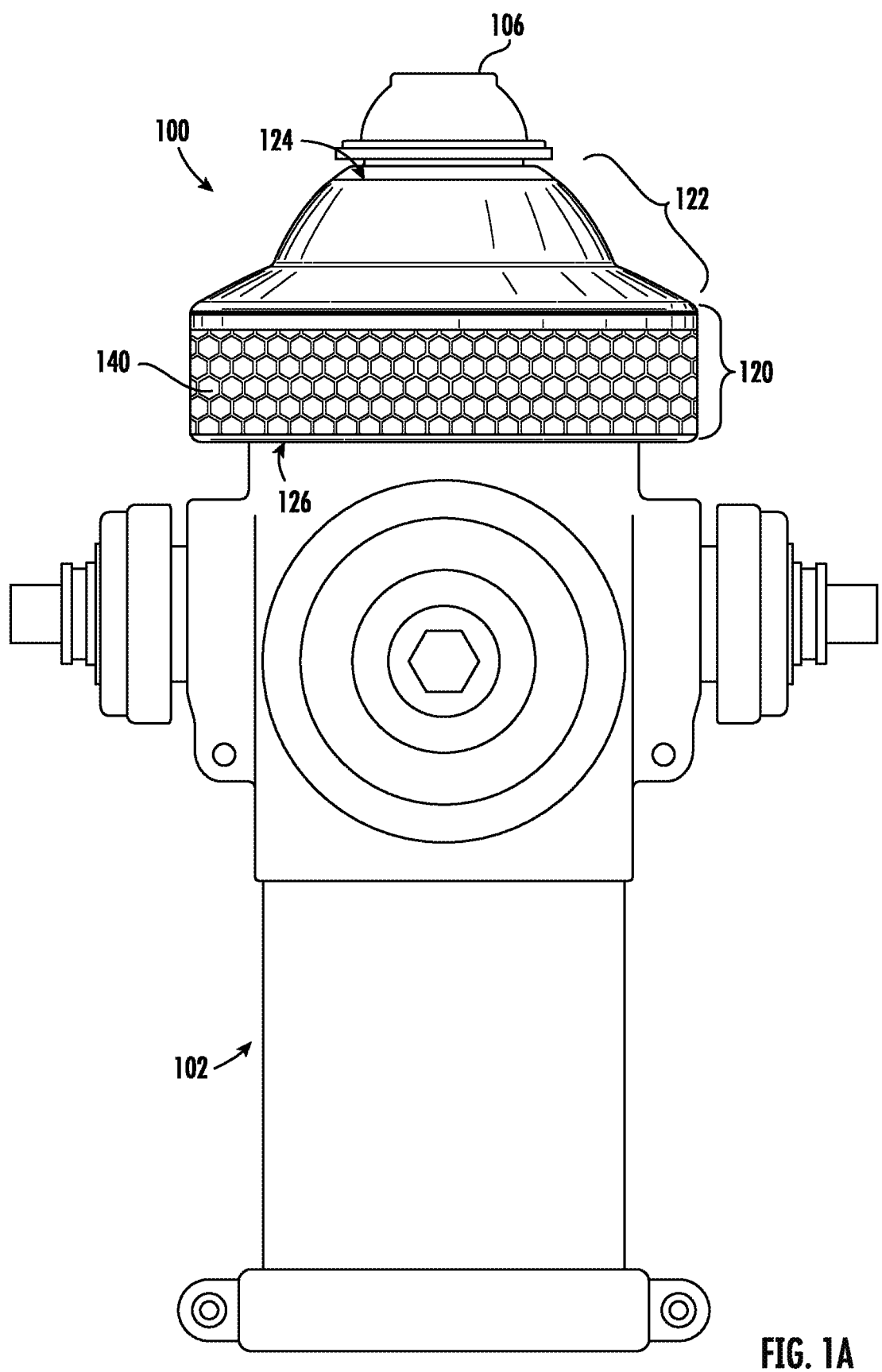
FIGS. 1A through 1C show aspects of one embodiment of an elastic protective cap or covering device for a fire hydrant.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, sequence identity (e.g., when comparing two or more nucleotide or amino acid sequences), mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

Figure 1B:
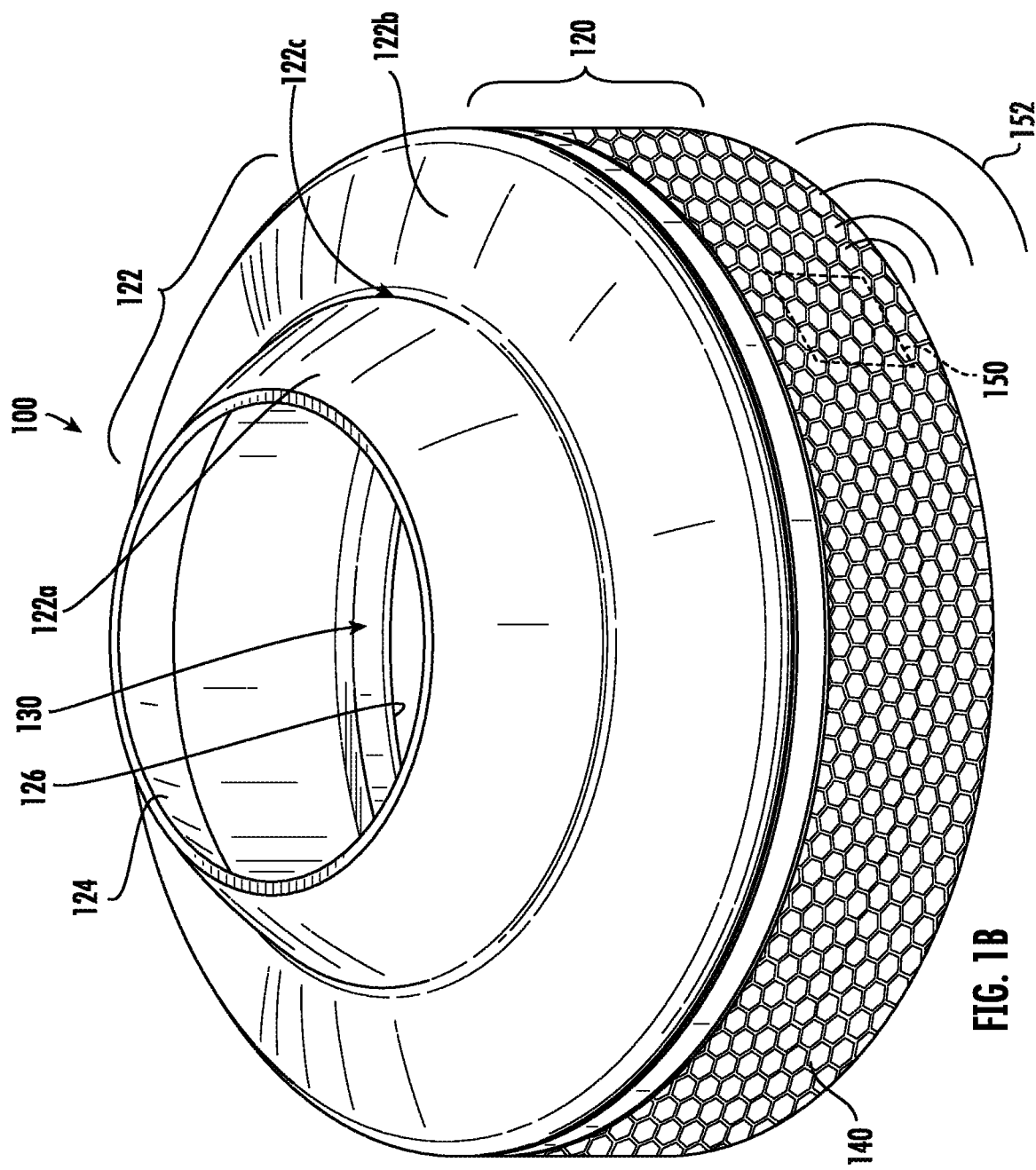
Figure 1C:
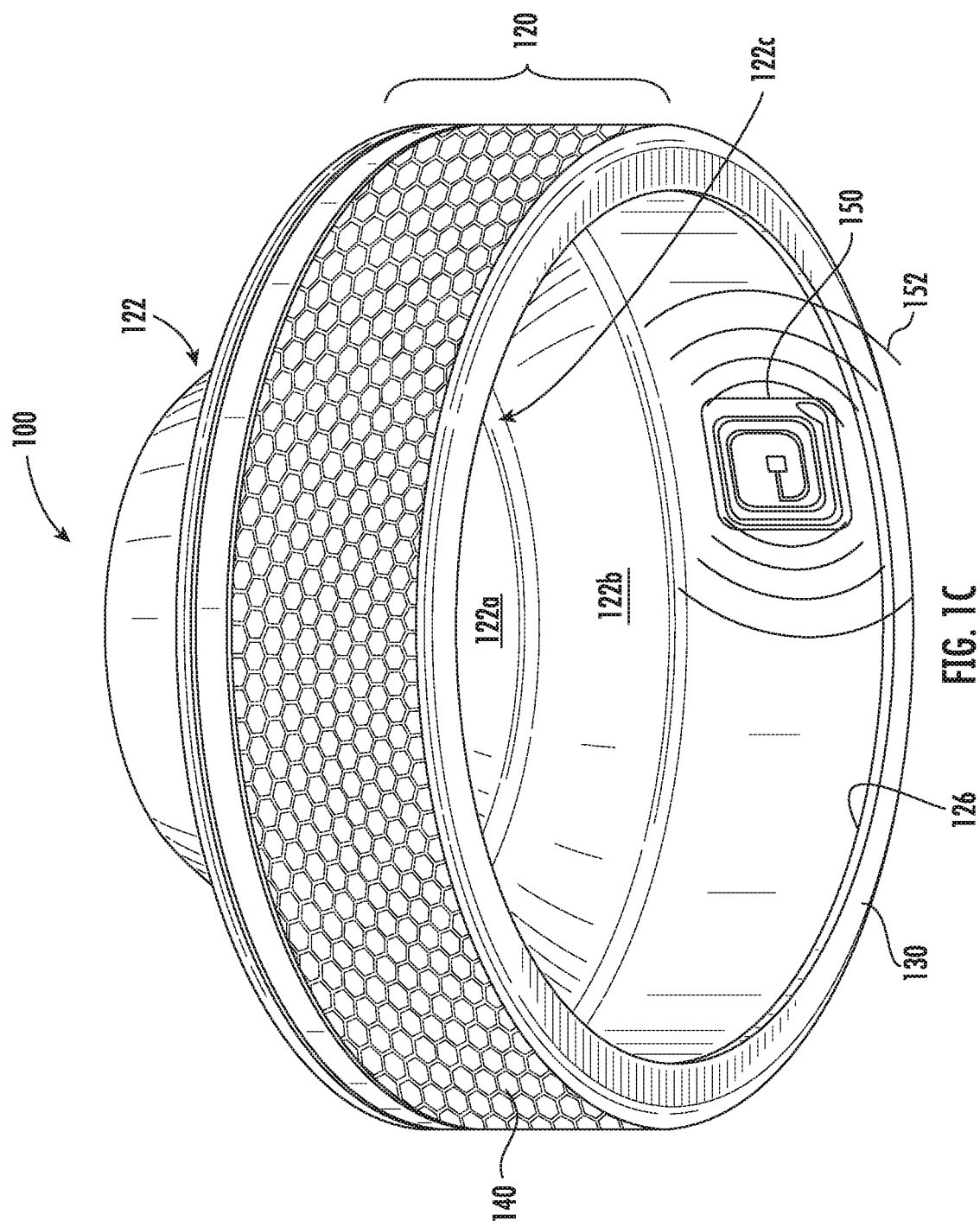

Referring now to FIGS. 1A through 1C, various example embodiments and aspects of a pliable protective elastic covering devices are shown. The embodiment of FIGS. 1A through 1C is particularly configured to cover a top of a typical fire hydrant. Because fire hydrants are not necessarily a uniform shape and size, the fire hydrant covering device 100 (also referred to as a protective cover and/or sleeve) is capable of being molded to the shape of any desired fire hydrant 102, and particularly the upper portion thereof. In some embodiments, fire hydrant covering device 100 is configured to elastically secure over the bonnet 104, or cap or upper portion, of a fire hydrant 102, as illustrated in FIG. 1A. Although some variation exists between various fire hydrant brands and styles, the majority of fire hydrants in existence in municipalities and communities in the United States and elsewhere still include a typical bonnet shaped upper portion to which the disclosed fire hydrant covering device 100, or bonnet sleeve, will be suitable.

In some embodiments, the fire hydrant covering device 100 will have a thickness up to and including approximately 0.125 inches, or a range of about 0.05 inches to abut 0.25 inches. In some embodiments, fire hydrant covering device 100 will have a color corresponding to one of the colors specified in NFPA 291 (*NFPA 291: Recommended Practice for Fire Flow Testing and Marking of Hydrants*, 2016 National Fire Protection Agency). As such, the covering device is configured to convey information regarding certain aspects (e.g., a volumetric flow rate range) about each fire hydrant.

Fire hydrant covering device 100 can in some aspects be configured, as shown in FIGS. 1B and 1C, to have a lower lip 130, or lip portion, that is configured to grasp around and/or underneath a cap or bonnet of a fire hydrant to secure the covering device 100 onto the fire hydrant. In some embodiments, this lower lip 130 can be thicker than other portions of the covering device, and/or can comprise a portion that is directed radially inward underneath the cap of the fire hydrant.

In some such embodiments, the covering device 100 can comprise two portions, namely a bottom portion 120 and top portion 122. Thus, covering device 100 or bonnet sleeve can be formed as a two-part cap, with bottom portion 120 configured to be secured to a fire hydrant bonnet (e.g., under an edge of the fire hydrant bonnet or top cap) and top portion 122 that is removably inserted over a valve 104 at the top of the fire hydrant 102. In these embodiments, bottom portion 120 and top portion 122 are molded as a single unitary piece, whereas in other embodiments it can be advantageous for the top portion 122 to be movably attached to the bottom portion 122, e.g., by a folded flap arrangement.

Continuing with FIGS. 1A and 1B, top portion 122 of covering device 100 can comprise two tapered segments 122a and 122b joined by a seam 122c. Tapered segments 122a and 122b forming top portion 122 can form two tapered circular planes joined at seam 122c and forming a generally conical shape that substantially matches the shape of a bonnet of a fire hydrant. For example, tapered segment 122b can have a more horizontal plane as compared to a more vertical plane of tapered segment 122a. As such, when applied to a fire hydrant, top portion 122 can substantially align with the contour and shape of the bonnet of the fire hydrant to provide a secure and stable fit to the fire hydrant, but also to provide protection of the fire hydrant bonnet from environmental elements. Even where covering device 100 is applied to a fire hydrant having a bonnet or top cap that is not shaped the same as top portion 122, the flexible and resilient nature of the product from which covering device 100 can allow it to substantially conform to the shape.

In the embodiments shown, covering device 100, as depicted in FIGS. 1A, 1B and 1C, can comprise a generally cylindrical structure with openings on opposing ends. For example, upper open end 124, near an upper end of tapered segment 122a and opposite lower lip 130, can comprise a hole or opening through which a top portion of a fire hydrant can pass when covering device 100 is in use. That is, upper open end 124 can be located coaxially with a valve actuator 106 on top of a fire hydrant 102 when applied to a fire hydrant so that valve actuator 106 can protrude through upper open end 124, at least partially, so that the fire hydrant can be used (e.g., the valve turned on/off) without the need to manipulate the covering device in any way.

Opposite upper open end 124 a second or lower open end 126 can be provided near lower lip 130, or created by the inner diameter of lower lip 130. Lower open end 126 is sufficiently large to allow covering device 100 to slidingly engage fire hydrant 102, or at least an upper portion thereof to adequately cover the bonnet 104 of fire hydrant 102. Upper open end 124 and lower open end 126 can be coaxial with one another, and with fire hydrant 102 when in an installed condition.

In some embodiments, covering device 100 can have a solid upper portion, i.e. be devoid of upper open end 124. In such an embodiment upper end of tapered segment 122a can extend continuously upward to a form a fully enclosed cover. In such an embodiment valve actuator 106, as well as the rest of the bonnet 104 of the fire hydrant 102, can be covered by the covering device 100, requiring manual removal (e.g., without tools) so that the valve actuator 106 at the top of the fire hydrant can be actuated to enable the flow of water.

In some other embodiments, the covering device 100 can be configured to cover more than just the bonnet or upper portion of the fire hydrant, including the main body of the hire hydrant, with holes or openings formed at locations where the hoses are to be attached (e.g., outlets) for the flow of water. In some other embodiments, the covering device may have a radial protrusion in the form of a brim of a hat (e.g., partially or fully around the circumference of the covering device, at the lip portion or elsewhere) that will provide some protection from rain and snow corrosion of the main body of the fire hydrant.

Figure 2A:
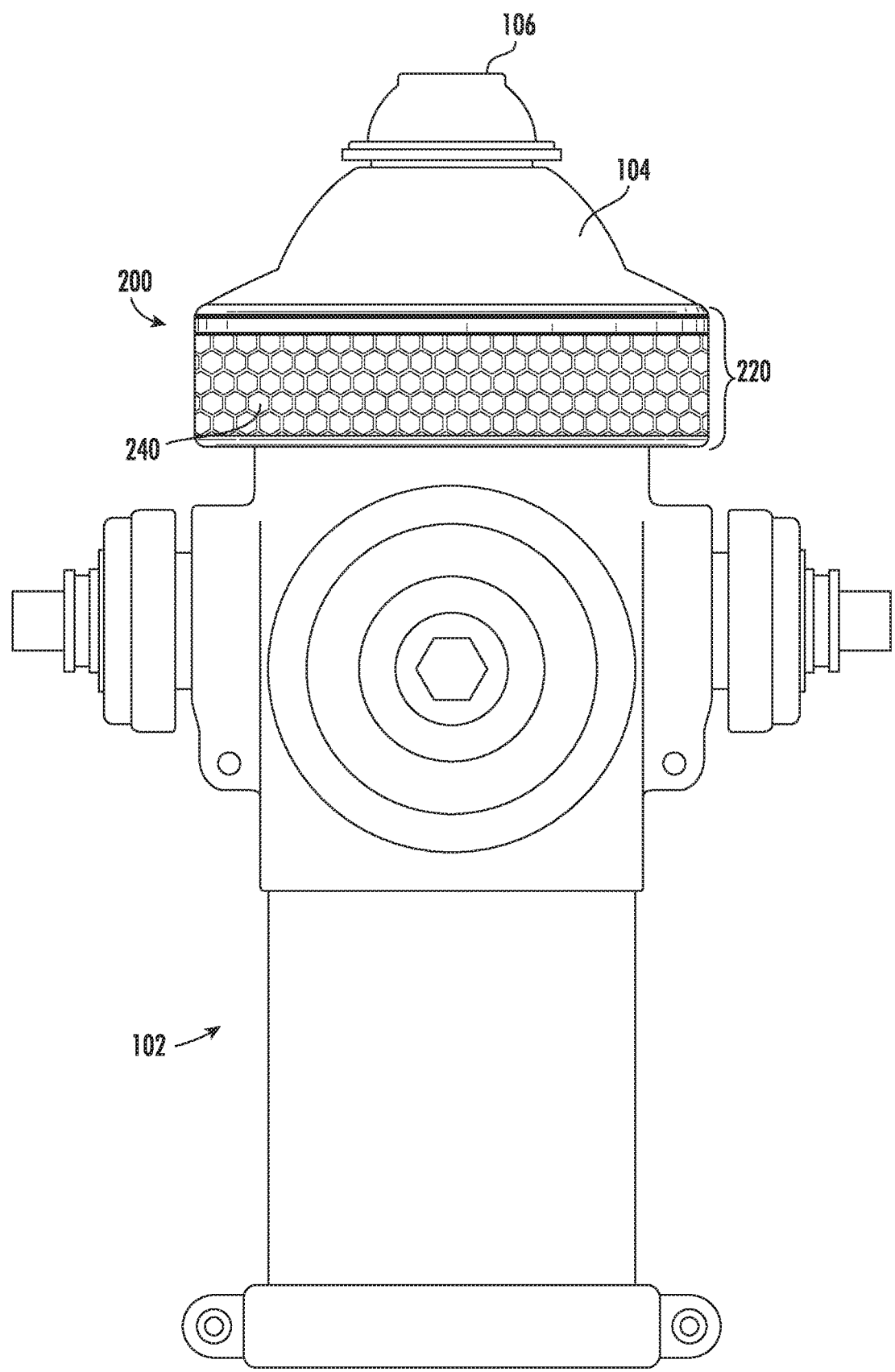
FIGS. 2A through 2C show aspects of another embodiment of an elastic protective cap or covering device for a fire hydrant.
Figure 2B:
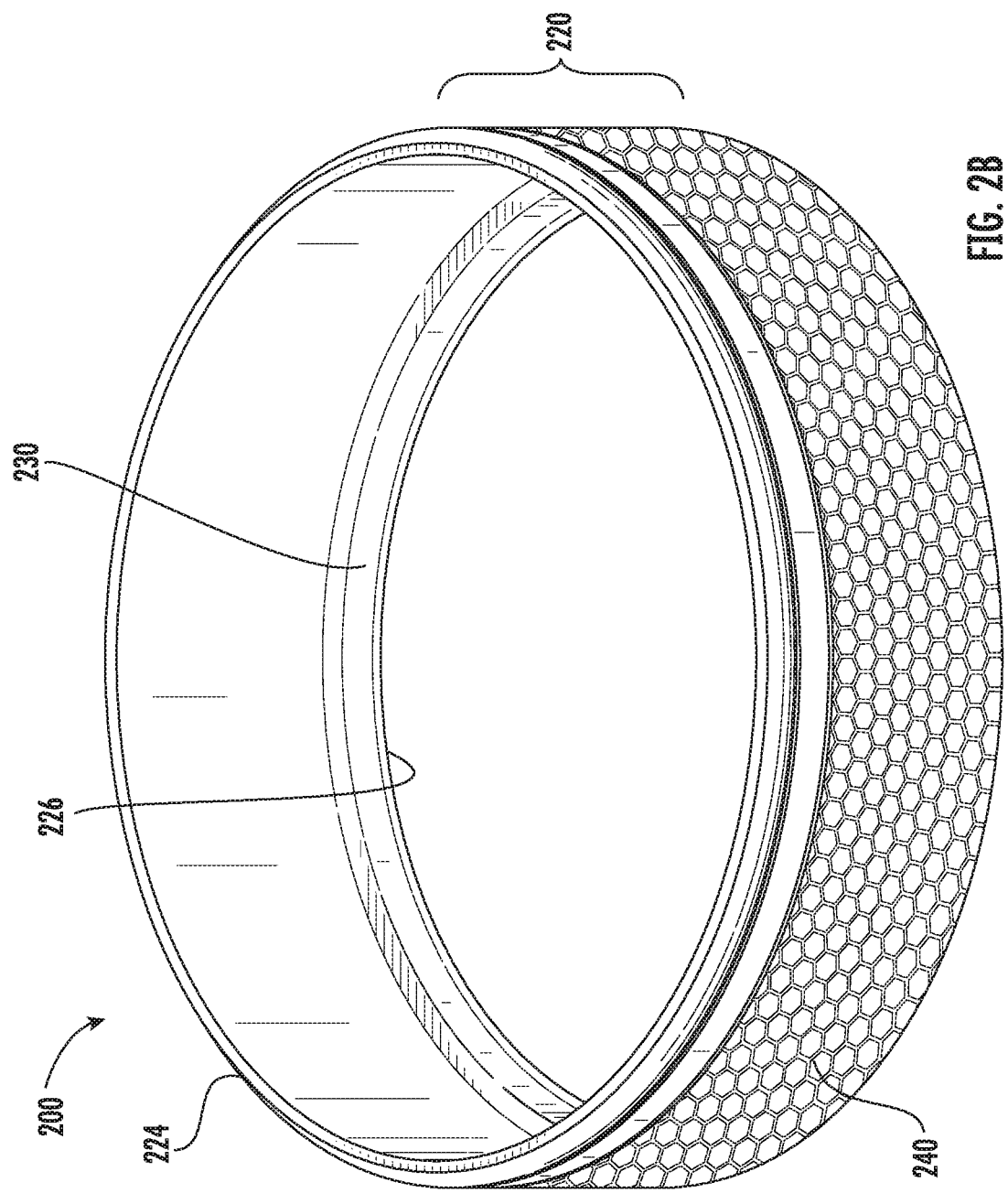
Figure 2C:
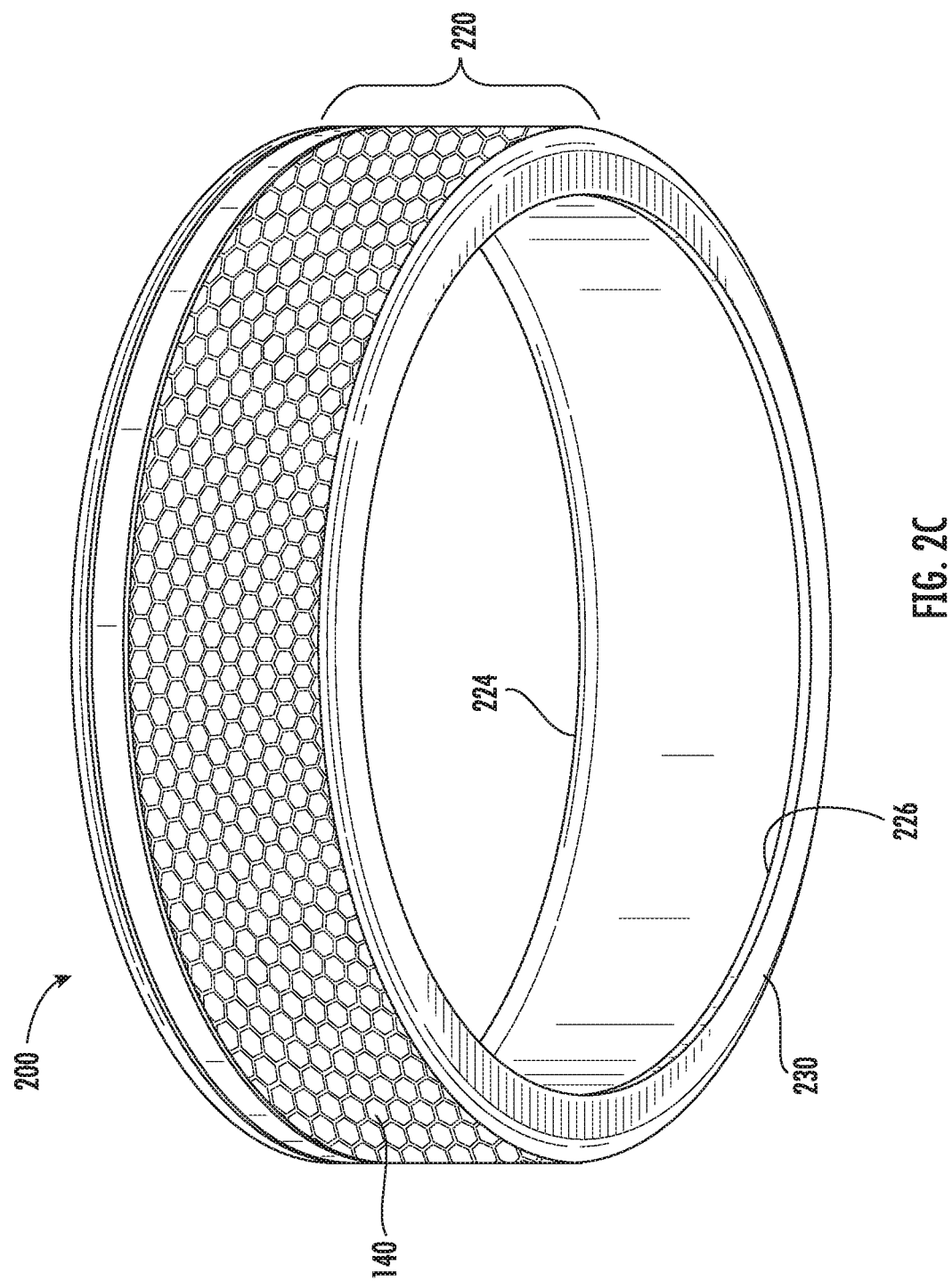

Turning now to FIGS. 2A through 2C, fire hydrant covering device 200 can in some aspects be configured similar to fire hydrant covering device 100 as shown in FIGS. 1A through 1C, but without top portion 122. That is, in some embodiments fire hydrant covering device 200 can be made of similar materials and configured similarly to fire hydrant covering device 100, but instead of including a tapered upper portion only include a substantially cylindrical lower portion, or band 220, designed to resiliently engage the lower portion of a fire hydrant bonnet 104. Or, in some aspects, can use hook and loop fastening material/components to secure covering device 200 around a fire hydrant.

Similar to fire hydrant covering device 100, fire hydrant covering device 200 can in some aspects comprise a lower lip 230, or lip portion, that is configured to grasp around and/or underneath a cap or bonnet 104 of a fire hydrant 102 to secure the covering device 200 onto the fire hydrant. FIGS. 2B and 2C clearly depict lower lip 230. In some embodiments, this lower lip 130 can be thicker than other portions of the covering device, and/or can comprise a portion that is directed radially inward underneath the bonnet 104 of the fire hydrant.

In the embodiments shown, covering device 200, as depicted in FIGS. 2A, 2B and 2C, can comprise a generally cylindrical structure with openings on opposing ends. For example, upper open end 224, opposite lower lip 230, can comprise a hole or opening through which a top portion or bonnet of a fire hydrant can pass when covering device 200 is in use. That is, upper open end 224 can be located coaxially with a valve actuator 206 on top of a fire hydrant 102 when applied to a fire hydrant so that valve actuator 106, and even most of bonnet 104, can protrude through upper open end 224 so that the fire hydrant can be used (e.g., the valve turned on/off) without the need to manipulate the covering device in any way.

Opposite upper open end 224 a second or lower open end 226 can be provided near lower lip 230, or created by the inner diameter of lower lip 230. Lower open end 226 is sufficiently large to allow covering device 200 to slidingly engage fire hydrant 102, or at least an upper portion thereof to adequately cover at least a portion of bonnet 104 of fire hydrant 102. Upper open end 224 and lower open end 226 can be coaxial with one another, and with fire hydrant 102 when in an installed condition.

Covering devices 100 and 200 can in some aspects be pliable and capable of being deformed under their own weight when placed on a flat surface. In some other embodiments, some, most, or substantially all of the covering devices can be made of a more rigid material (e.g., PVC). Regardless of the composition, covering devices 100 and 200 can be configured to protect the top surface of the fire hydrant from rust and debris and from exposure to the environment. This is advantageous for at least the reason that the fire hydrant will remain clear of rust and debris, ensuring reliable operation thereof in an emergency situation.

Covering devices 100 and 200 can in some aspects be provided in several colors that are specified by NFPA 291 as being suitable for use in identifying a volumetric flow rate range that a particular fire hydrant is rated to provide. For example, a fire hydrant that has been tested to provide an inadequate flow rate (e.g., below 500 gallons per minute, GPM) may have a covering device that is red; a fire hydrant that has been tested to provide a marginally adequate flow rate (e.g., from 500 to 999 GPM) may have a covering device that is orange or yellow; a fire hydrant that has been tested to provide a flow rate that is adequate for residential areas (e.g., from 1000 to 1499 GPM) may have a covering device that is green; and a fire hydrant that has been tested to provide a flow rate that is adequate for all areas (e.g., above 1500 GPM) may have a covering device that is blue. As such, covering devices 100 and 200 can be provided in any of the above colors as designated by NFPA 291, or other appropriate and accepted color coding schemes, such that use of such fire hydrant covering devices provides readily identifiable information to an observer, e.g. fire fighter. Moreover, unlike traditional fire hydrant markings that are typically some form of paint, and degrade from ultraviolet light, moisture, dirt and debris, the disclosed covering devices 100 and 200 provide a durable color coding system that readily identifies the flow rate available at each fire hydrant.

Referring now to the example embodiments of covering devices 100 and 200, as shown for example in FIGS. 1B and 1C, in some embodiments they can further include an identification device 150 (e.g., an RFID tag) configured to provide pertinent characteristics or operational information (e.g., location, proximity, flow rate, pressure, and the like) of the fire hydrant assigned to the identification device. The RFID tag or label can be active or passive. While only shown in FIGS. 1B and 1C for illustration purposes, the same identification device 150 can be provided in the embodiment of FIGS. 2A through 2C, as well as the other covering devices in FIGS. 3 through 5. Such an identification device 150 can either be pre-programmed to a specific fire hydrant or can be programmed remotely while remaining molded within the protective cover.

In some embodiments, a storage region can be included in, for example, covering device 100 or 200. In order to protect the contents of this storage region, it is advantageous for this storage region to be located on, and accessible from, an internal surface of the covering device. As such, while it is possible for the storage region to be in the form of an open cavity or void, it is preferable in some embodiments, to provide enhanced environmental protection, for the storage region to be formed as an internally-accessible slot into which an identification device 150 (e.g., an RFID tag) can be removably inserted to identify the pertinent characteristics or operational information (e.g., location, proximity, flow rate, pressure, and the like) of the fire hydrant assigned to the identification device. In still other embodiments, the internally-accessible slot may be sealed after insertion of the identification tag, either temporarily to prevent moisture ingress or permanently to provide enhanced tamper resistance. In a further embodiment, the identification tag 150 may be embedded within the protective cover during formation (e.g., molding) of the covering device 100 or 200 and the identification device can either be pre-programmed to a specific fire hydrant or, more preferably, may be programmed remotely while remaining molded within the protective cover.

In some aspects where the identification device 150 can be configured to store and transmit information pertaining to the fire hydrant on which it is installed, an energy source or device (e.g., a battery) may be needed. In some such aspects, this energy source can be integral with the identification device, while in other aspects, this energy source can be discrete from, and in electrical communication with, the identification device. In some aspects, the energy source may be replaceable to extend a service life of the protective covers, even when the identification device itself is not removable from (e.g., is integral with) the protective cover.

As is shown in FIGS. 1B and 1C, in embodiments having the identification device, it is advantageous for such a device to transmit pertinent data about the fire hydrant to emergency personnel by transmitting a frequency 152 that could be detected and utilized by such emergency personnel to locate and determine a suitable and/or desired fire hydrant in an emergency situation. While it will be understood by those skilled in the art that any suitable identification device 150 could be selected for any data transmission range, in one embodiment a battery-operated radio-frequency identification (RFID) chip is inserted into or otherwise applied to the covering device 100 or 200 in a suitable location, as is shown in FIGS. 1B and 1C. In such embodiments, this RFID chip contains all of the pertinent information concerning the particular fire hydrant with which the RFID chip is associated and is capable of transmitting such information on a specified frequency 152 that emergency personnel are capable of receiving with a suitable communications antenna.

In some such embodiments, it is advantageous for the RFID chip to be capable of transmitting the pertinent information over a range of approximately 800 to 1,000 feet, but other ranges may be selected. In some embodiments, to conserve power, the identification device may remain in a monitoring sleep state until activated upon receipt of an activation signal, which may be generated by emergency personnel using the communications antenna or other suitable device. Through this remote communication capability, emergency personnel will be capable of locating the desired fire hydrant even in low-visibility scenarios (e.g., darkness, fog, rain, physical obstructions, etc.). Furthermore, in instances where there is a plurality of fire hydrants within proximity of an emergency location, emergency personnel may determine (either actively querying or passively reading) which fire hydrant will be optimal for a given scenario, considering both proximity and available flow rate.

Additionally, the data stored within the identification device can be more precise, such that, while the protective cover may have a color to indicate that the fire hydrant is capable of providing from 500 to 999 gallons per minute (gpm), the identification tag may be capable of transmitting that the fire hydrant has been tested to deliver, for example, 900 gpm. This added precision may allow for the use of fire hydrants in certain scenarios where a flow rate above a minimum indicated by the color of the protective cover is needed, but the needed flow rate is still within the range indicated.

In some embodiments, the identification device may be configured to be compatible with active RFID technology. Such an active RFID implementation will have a power source embedded with the identification device or elsewhere within the protective cover to be in electrical communication with the identification device. In some embodiments, the power source can be a button cell battery which can have, for example, a useful life of from two to five years, depending on usage. The use of such active RFID technology will allow each fire hydrant equipped with such identification devices to be digitally catalogued and also provide enhanced detection capabilities with compatible RFID reader devices, whether hand-held or mobile RFID readers. Each such protective cover equipped with an active RFID identification device allows a reader to remotely identify the characteristics and location of each unique fire hydrant. Such active identifier devices are configured to emit a detectable signal that is uniquely identifiable by a compatible reader to determine the identity of the particular fire hydrant.

As is also shown in FIGS. 1A and 2A, protective covers 100 and 200 configured for use on fire hydrants can be configured with an entry point (e.g., upper opening 124/224) to allow for the addition of oil to the fire hydrant for lubrication and maintenance of such a fire hydrant without the need of removing the protective cover from the fire hydrant.

In each of the embodiments disclosed herein, and as exemplified in FIG. 5C, the covering devices can be configured to have a logo, letters, numbers, symbols and the like on an outer surface for purposes of communicating information to an observer. Such indicating information can be screen-printed thereon and/or contrast molded therein. In some such embodiments, the contrast molding may be achieved by molding a secondary layer of contrasting material, either on top of or beneath the primary outer material of the covering device. In FIG. 5C, for example, covering device 520 applied to a municipal water maker 522 has informational text 524 on an outer surface, namely the words "City of Oxford" and "R/W" for rural water. Any such informational text or graphics can be applied to any of the embodiments disclosed herein.

Additionally, in each of the embodiments discussed hereinabove, whether for fire hydrants or other protective covers, each of the protective covers can in some aspects be created from or include a reflective material (e.g., a reflective silicone) in order to provide enhanced visibility in low-visibility scenarios, especially in darkness. This reflective element can be implemented by permeating the silicone with reflective particles or, in some embodiments, a reflective coating may be applied during or after formation of the protective cover. In some embodiments, such as are shown in FIGS. 1A through 1C and 2A through 2C, the protective covers 100 and 200, respectively, reflective material 140 (e.g., an adhesive reflective tape) can be affixed circumferentially around an externally visible portion of the protective cover, including for example around lower portion 120/220. In some embodiments, the reflective material may be discretely positioned at specific positions on the protective cover to minimize the amount of reflective material needed to achieve enhanced low-light visibility. Although not shown in the protective devices of FIGS. 3 through 5, such reflective materials may also be affixed to any such device to achieve the same enhanced visibility. In some embodiments, the color and reflective element combined provide for increased visibility of the protective devices both in daylight and darkness.

Furthermore, in some embodiments protective covers or sleeves similar to protective covers 100 and 200 depicted in FIGS. 1 and 2 are provided for and attached over the surface of the front and side caps of fire hydrant 102. These auxiliary protective covers may be color-coded in the same way as the protective cover for the top/bonnet of the fire hydrant to provide a larger visible surface area to indicate the available flow rate at a particular fire hydrant. In some other embodiments, these side covers can have further identification features (e.g., other colors, patterns, etc.) to indicate other features of the fire hydrant. The identification device 150 discussed above can, in some embodiments, also be installed in these auxiliary protective covers.

Thus, provided herein are devices for protecting and/or covering an upper portion of a fire hydrant, the device comprising a first portion in a shape of a cap of a fire hydrant and a lip at a bottom edge of the first portion, wherein the device comprises an elastic flexible material. The lip can be configured to hold the device onto the cap of the fire hydrant. In some aspects, the protective/identifying cover can be configured to cover all or substantially all of the cap of the fire hydrant. In some aspects, the upper portion can be configured to cover a water flow valve at a top of the cap of the fire hydrant. In some aspects, the upper portion is movably attached and/or integral to the bottom portion. There can be an open end, wherein the device is configured such that a water flow valve of the fire hydrant protrudes at least partially through the open end when the device is in an installed position. Moreover, the open end can be opposite the lip of the device.

In some embodiments, such devices can comprise an integrated identification device, wherein the identification device is configured to store operational information about the fire hydrant. A storage region can be formed into the protective cover configured to receive an identification device, and wherein the identification device is configured to store operational information about the fire hydrant and to transmit this operational information to emergency personnel. The identification device can be configured as an active RFID device for digitally cataloguing and discovering a location of the device using a compatible RFID reader, and if needed the identification device can be in electrical communication with a power source, e.g. a button-cell battery.

In some aspects, the device can further comprise one or more auxiliary protective covers configured to protect a front and/or a side cap of the fire hydrant. In some aspects, such fire hydrant cover/protective devices can comprise one or more predetermined colors associated with an identifying characteristic. They can also include a reflective material, e.g. a reflective silicone material, reflective particles embedded within a silicone material, a reflective coating applied to an exterior of the protective cover during or after formation thereof, and/or reflective materials including a reflective tape affixed to at least part of an outer circumferential area of the protective cover.

Therefore, in some aspects provided herein are fire hydrant bonnet covers comprising an elastic flexible material component formed in a shape substantially similar to a bonnet portion of a fire hydrant, the elastic flexible material component comprising, an upper portion comprising a shape of the bonnet of the fire hydrant, and a lower portion defining a cylindrical structure with a lip at a bottom edge of the lower portion, wherein the lip is configured to hold the elastic flexible material component onto the bonnet of the fire hydrant, a predetermined color associated with an identifying characteristic of the fire hydrant to which it is to be applied, and a reflective material applied to or integrated into the elastic flexible material component.

Turning now to the embodiments illustrated in FIGS. 3A through 5C, while many common building materials are used in damp or wet installation conditions (e.g., buried in or in contact with soil, stone or other terrain), virtually all of these common building materials suffer structural degradation when exposed to moisture for prolonged periods. For example, when wood is placed in contact with a moisture source, such as the ground, the wood will absorb this moisture to the point of saturation, which causes structural decay of the wood fibers and also attracts various wood eating pests, such as termites. These pests are attracted to such moist wood, hastening the failure of such wooden installations. While certain types of wood and treatment processes for such wood have been developed in an attempt to extend the life of such wood-based in-ground installations, this merely slows the rate of degradation, which remains inevitable. This fact is recognized in most modern building codes, which do not permit direct contact of wooden materials with the ground, attempting to ensure that wooden building materials remain dry, slowing structural degradation due to moisture saturation and/or wood-eating pests. However, it is still common for wood to be installed in contact with, or buried in, the ground in non-structural applications, such as fence posts, utility poles, telephone poles, mailboxes, recreational playsets, and the like. As such, these wooden installations remain susceptible to premature degradation from exposure to moisture.

Likewise, ferrous building materials also suffer from structural degradation from in-ground installations, in which these ferrous materials are constantly exposed to moisture, resulting in rust, which compromises the structural integrity of the ferrous building material. As such, many modern building codes contemplate the use of concrete materials for such in-ground building applications (e.g., building foundations), as it is more water-resistant than either wood or metal, but concrete is not immune to premature degradation from continual exposure to moisture, and will experience premature structural degradation eventually in such conditions. Accordingly, a need exists to provide water-resistant protective coverings to extend the useful life of such structures.

In line with this need, elastic protective covers capable of providing insulation and protection from prevailing environmental conditions are disclosed herein. Such elastic protective covers are typically molded into a desired shape and are flexible enough to allow for easy installation over at least one end of virtually any structure with a compatible or substantially similar shape (e.g., a same or substantially similar cross-sectional shape). For purposes of exemplification and not intended to be limiting, FIGS. 3A through 5C show various example embodiments of protective elastic covering devices and illustrate various advantageous features associated therewith.

Figure 3A:
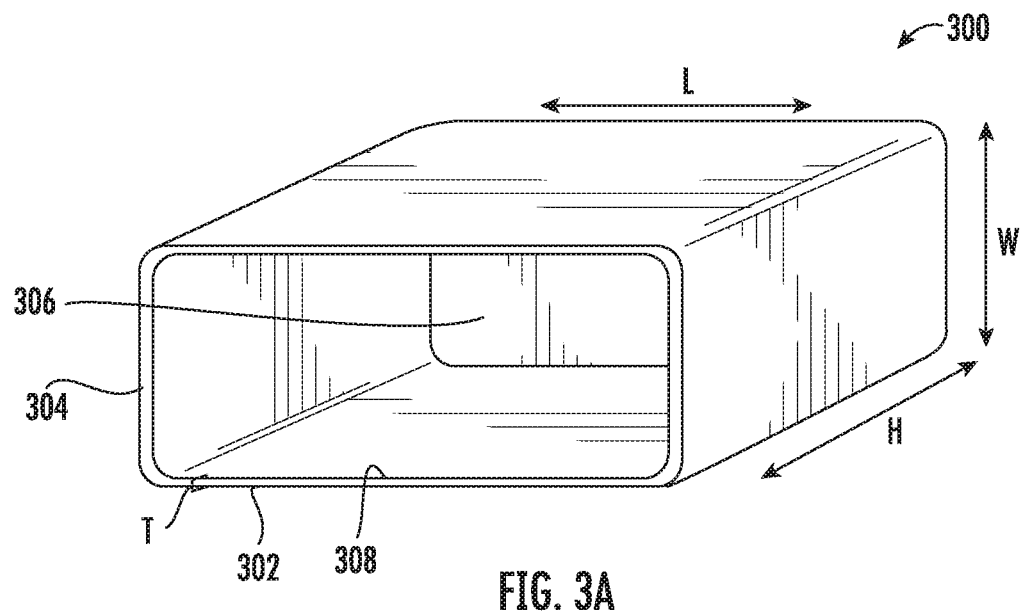
FIGS. 3A through 3B show various example embodiments and features of pliable protective elastic covering devices in accordance with the disclosure herein.
Figure 3B:
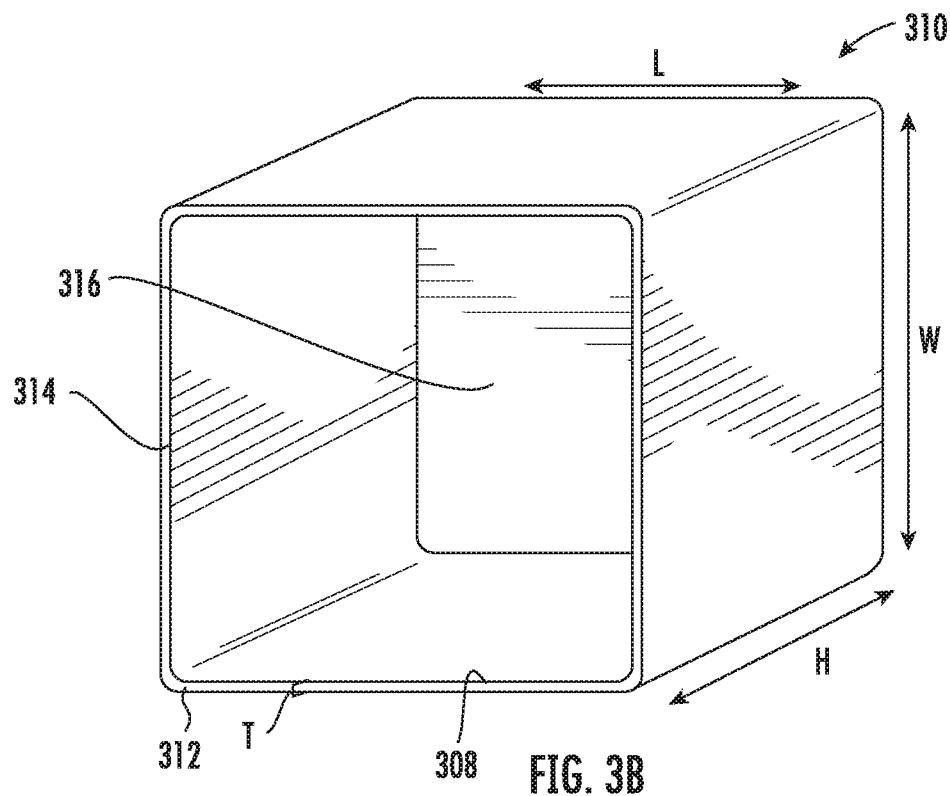

Referring now to FIGS. 3A through 3B, various example embodiments and aspects of pliable protective elastic covering devices 300 and 310 are shown. In the example embodiments shown in FIGS. 3A and 3B, pliable protective elastic covering devices 300 and 310 can comprise a substantially square or rectangular structure having opposing top/bottom walls 302/312 and opposing side walls 304/314 forming the substantially square or rectangular shape, with a closed end 306/316 and an open end 308/318. In some embodiments, the pliable protective elastic covering devices 300 and 310 can comprise or be made from an elastic, stretchable polymer comprising silicone, neoprene (e.g., polychloroprene or other suitable synthetic rubber compounds), or combination thereof, that are produced by polymerization of chloroprene or other similar products, such as Neogreen, Lycra, Thermocline, and/or Silicone Rubber.

These covering devices can be configured to protect one or more surfaces (e.g., an end) of building substrates, such as wood, metal, or concrete. These covering devices not only create a synthetic "skin" for the covering and protection of wood, concrete and metal, but will also provide covering for other substrates as well. These example embodiments are thus configured to be a synthetic end cover for wood, lumber, concrete, synthetic posts and/or boards, and the like, providing protection against environmental conditions that promote weathering, deterioration, and/or liquid absorption while also being capable of having several aesthetically pleasing and/or identifying features.

Continuing with FIGS. 3A and 3B, two example form factors are shown, with accompanying example dimensional features. In FIG. 3A, the pliable protective elastic covering device 300 is configured, for example, as an end cap for a piece of dimensional lumber (e.g., 2 inches (in.) by 4 in., with an actual dimension of approximately 1.5 in. by 3.5 in.). Thus, the length L and width W of pliable protective elastic covering device 300 can be about 3.5 in. and about 1.5 in., respectively, if configured for application on a piece of 2 in. by 4 in. lumber. Similarly, in FIG. 3B, the pliable protective elastic covering device 310 is configured as an end cap for piece of dimensional lumber having a substantially square cross-section, e.g. 4 in. by 4 in., which is a common size used, for example, as a fence post that is at least partially buried in the ground. Thus, the length L and width W of pliable protective elastic covering device 310 can be about 4 in. and about 4 in., respectively, if configured for application on a piece of 4 in. by 4 in. lumber. The height H (depth) of the example embodiments of FIGS. 3A and 3B can be any suitable or desirable length depending on the application and how much surface area is needed to be protected. In the embodiments shown in FIGS. 3A and 3B, the example embodiments have a thickness T of about 0.125 in., but any suitable thickness may be selected to provide a desired ease of installation and amount of protection, primarily from handling and/or impacts. In some embodiments, it may be advantageous to have a thickness T of about 0.01 in. to about 0.15 in., and in some embodiments between and including approximately 0.0625 in. and approximately 0.09375 in. In some embodiments, it may be advantageous to design the covering devices to have a smaller cross-sectional area than the structure around which it will be attached, thus ensuring a substantially water-tight or at least water-resistant seal at an upper end of the covering device. The amount by which the covering device has a smaller cross-sectional area different from that of the structure around which it will be installed will necessarily vary depending on the overall cross-sectional area of such a structure, given the elastic nature of the covering device. For example, a covering device designed to cover a 1 in. by 1 in. piece of lumber may require a cross-sectional area very near 1 in. by 1 in., but a covering device designed to be installed around a 6 in. by 6 in. piece of lumber may has a significantly smaller cross-sectional area (e.g., 5.5 in. by 5.5 in.) and still be able to be installed with minimal effort.

Turning now to FIGS. 4A and 4B, several example features and applications of such a covering devices are illustrated. As can be seen in FIG. 4A, in some embodiments a covering device 400 can have a main body 402 and receiving portion 404 (e.g., 4 in.) near an opening 406. Receiving portion 404 can comprise a relatively small proportion of the main body 402 (e.g., the first about 2 in. to about 4 in. from opening 406), or in some aspects may comprise a substantially large portion of the main body 402. Receiving portion 404 can have a smaller cross-sectional area than main body 402, as illustrated in FIGS. 4A and 4B. Receiving portion 404 can in some embodiments also have a thickness less than a thickness of the main body 402, allowing for greater pliability and sealing against the structure (e.g., lumber) around and/or over which it is installed. In some embodiments, receiving portion 404 can be designated as a portion that is to be above-grade (e.g., not buried in the ground) when the structure is installed. In order to facilitate more precise installation depths, a visible marking (e.g., a line, a cross-hatched portion, a circumferential line, a written portion, a stepped portion, and the like) can be provided on the covering device so as to be visible during installation of the structure to ensure a proper installation depth.

In some embodiments, receiving portion 404 of covering device 400 can have an aesthetically pleasing visual design formed therein or thereon, which may include one or a plurality of contrasting colors. The covering device 400 can also be manufactured in any of the pre-defined colors approved for use by the Occupation Safety and Health Administration (e.g., black, white, orange, brown, green, and red), as well as virtually any other color or combination of colors.

In some embodiments, and as best seen in FIG. 4B, receiving portion 406 can comprise a tapered edge 408 to facilitate an easier application of covering device 400 on a substrate or material to be protected, and in some aspects can comprise longitudinally oriented internal ribs 410 or structurally reinforcing elements configured to increase rigidity and/or strength of covering device 400. Moreover, in some aspects longitudinally oriented internal ribs 410 can extend from the closed end of the protective covering device up to the beginning of the receiving portion 404. These longitudinally oriented internal ribs 410 can in some embodiments facilitate installation of the covering device 400 onto the structure by providing air flow passages to allow air that is within the covering device below the structure during installation to bypass the structure, rather than be trapped therebelow. In some such embodiments, a removable feature can be included in the receiving portion 404 to allow for such vented air to escape beyond the upper portion. In some other embodiments, the receiving portion 404 or upper portion of covering device 400 can be designed so as to be able to be folded down, at least partially, over an external surface of the main body 402, exposing the air passages formed by longitudinally oriented internal ribs 410. After the structure is fully inserted within the covering device, the receiving portion 404 can then be unfolded (e.g., folded back) to form the water-resistant seal around the structure. In some embodiments, the covering device 400 can be configured to be used by stretching the open end 406 over receiving portion, top, bottom, or side of the designated structure, thus forming an end piece or end cap, similar to applying a protective "skin" cover.

Figure 4C:
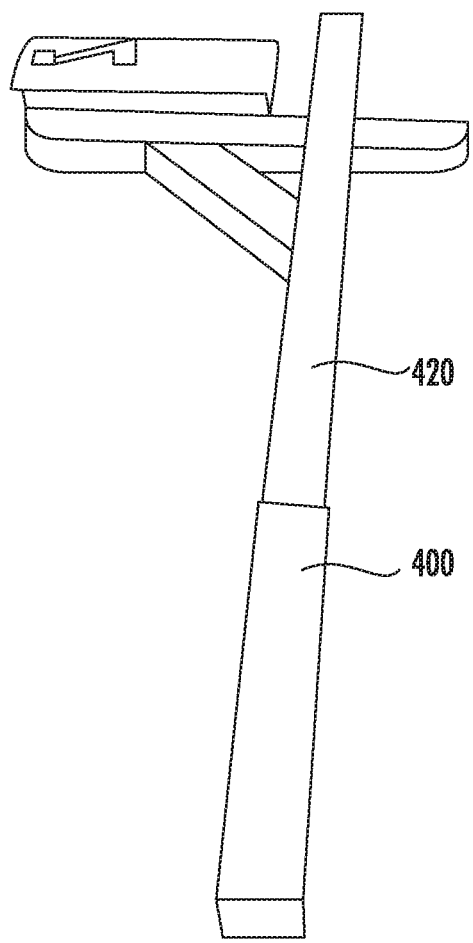
Figure 4D:
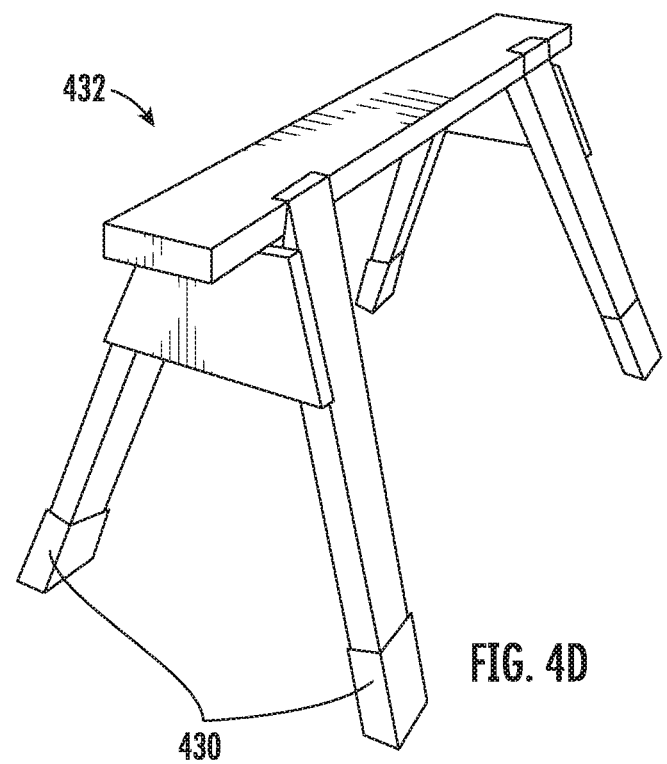

Referring now to FIGS. 4C through 4E, various example applications are shown for the protective sleeves of FIGS. 3A through 4B. By way of example and not limitation, an uncovered mailbox post can be at least partially immersed in soil and, thus, exposed to moisture from the soil. This absorption is especially problematic at the cut distal end of the mailbox post, where moisture will be absorbed by a wicking action at a much faster rate than through the lateral sides. As can be seen in FIG. 4C, once the covering device 400 is installed on and over the distal end of the mailbox post 402, the entire portion of the mailbox post that is covered by the covering device is protected from moisture by a substantially impermeable barrier, preventing moisture from being absorbed into the mailbox post from the ground. Next, in FIG. 4D, protective covering devices 430 are shown, which are designed to fit over and cover the legs of sawhorses 432, tables, and the like. High visibility colors may be used to provide enhanced safety to those working around such structures. In some embodiments, similar covering devices may be used to protect other structures that are placed in areas where moisture exposure is contemplated. It is not uncommon for such structures (e.g., sawhorses and work tables) to be placed in direct contact with the ground (e.g., on a jobsite, barn, and the like), so it is advantageous to provide moisture protection to these structures to extend their useful life. Finally, in FIG. 4E, it is shown, from various perspectives and in two example embodiments, that aesthetically pleasing covering devices 430 can be designed such that they are able to contour to angled structures 434, as shown. This is advantageous because the angled shape increases surface area contact between the structure and the covering device, reducing pressure points and extending the useful life of the covering devices. The illustration of the use of the disclosed elastic covering devices with a mailbox post and sawhorse are exemplary and not intended to be limiting, as such covering devices can be configured to be applied to most any substrate or structure without departing from the scope of the instant disclosure.

Referring now to FIGS. 5A through 5C, example applications of covering devices are shown that are capable of providing enhanced visibility and safety. For example, in FIGS. 5A and 5B the tops of the fence posts 510 (or other posts, poles or structures, e.g. utility poles) are capped with covering devices 500 that are a high visibility color, e.g. orange, allowing for better marking, for example, of a property boundary. Covering device 500, similar to other embodiments herein, can comprise an outer wall or main body 502 (here a cylindrical shape but any desired shape is within the scope of the instant disclosure) with an open end 504 (or receiving portion) and a closed end 506. Similarly, such covering devices can be provided in a specific color (e.g., yellow) to designate the presence of a particular type of hazard (e.g., natural gas equipment). Virtually any color may be used, depending on the hazard type presented. Furthermore, decorative designs can be formed into these covering devices, such as, for example, stepped concentric rings. In some such embodiments, one or more different colors can be used in forming these decorative features (e.g., red, white and blue, organizational colors, team colors, and the like).

In another example application, existing markers (e.g., concrete markers) that are used to warn of the presence of something (e.g., buried power lines, natural gas, utilities and the like). However, these markers typically have very poor visibility, whether from degraded paint or the inherently poor visibility of embossed or imprinted lettering without a contrasting color therein. For example, in FIG. 5C a concrete marker for a municipal water supply can typically be marked with "R/W" but without any contrasting colors to visually distinguish the letters from the rest of the marker. While this might be remedied to at least some extent by using a paint to provide this contrast, it is well known that paint must be reapplied frequently and will degrade from exposure to environmental conditions (e.g., solar radiation, rain, snow, blown debris, and the like). In some instances, a plain marker is used without any marking thereon to denote which specific type of danger is being warned of. In contrast, as is shown in FIG. 5C, a covering device 520 can be placed over top of the marker 522, the covering device having any of a variety of high-visibility colors (or combinations thereof), but are also configured to have informational text 524 displayed thereon (e.g., "WATER," "GAS," "City of . . . " etc.). This information can be created through a process of silk-screening, molding, and the like. In the case of molded letters, the letters can be embossed or imprinted and can be made of a material that is a contracting color from the rest of the covering device, so that the contrasting color will not wear off or need to be reapplied. Through this lettering, safety can be enhanced by clearly denoting the hazard(s) presented at a given location.

Thus, in some aspects, provided herein are protective covering devices for covering at least part of a structure, the devices comprising a solid bottom surface, at least one lateral side portion extending upwards from the bottom surface, and an open top portion, wherein the device comprises an elastic flexible material. The at least one lateral side portion can comprise at least four lateral sides. Each of the lateral sides can be substantially orthogonal to the bottom surface. The at least four lateral sides can comprise first and third lateral sides that are opposite each other, relative to the bottom surface, and connected to each other by second and fourth lateral sides, and wherein the first and third lateral sides and/or the second and fourth lateral sides are not orthogonal to the bottom surface. The bottom surface and the at least one lateral side portion can have a thickness in a range between and including approximately 0.0625 inches and approximately 0.125 inches.

In some aspects, in the protective covering devices the at least one lateral side portion comprises one or more longitudinally oriented ridges formed on an internal surface thereof. The ridges can be configured to contact an external surface of the structure to space apart, at least during installation of the covering device onto, over, and/or around the structure, the external surface of the structure from in internal surface of the at least one lateral side portion. The at least one lateral side portion can comprise an upper portion and a lower portion of the covering device, wherein the ridges are only formed within the bottom portion. The upper portion can have a cross-sectional area that is smaller than a cross-sectional area of the bottom portion. The upper portion can be flexible and configured to deform during installation of the covering device.

In some aspects, the elastic flexible material can be substantially impermeable to water intrusion. The elastic flexible material can comprise an elastic, stretchable polymer comprising either silicone or neoprene (e.g., polychloroprene or other suitable synthetic rubber compounds) that is produced by polymerization of chloroprene or other similar products, such as Neogreen, Lycra, Thermocline, and/or silicone rubber.

In some embodiments, the device can comprise words and/or images that are externally visible, wherein the words and/or images are formed by silk screening or molding processes. Moreover, the device can comprise one or more colors. Likewise, the device can comprise a reflective material as discussed hereinabove with respect to the fire hydrant cover.

The above example embodiments are intended to be illustrative in nature, and nothing described hereinabove is to be construed as a limitation regarding other configurations and embodiments which are otherwise within the scope of the subject matter disclosed herein. Other such embodiments of the current invention will be apparent to those skilled in the art from a consideration of this specification or practice of the invention disclosed herein. Thus, the foregoing specification is considered merely exemplary of the current invention, with the true scope thereof being defined by the following claims.

What is claimed is:

1. A device for covering an upper portion of a fire hydrant, the device comprising a first portion in a shape of a cap of a fire hydrant and a second portion defining a cylindrical structure with a lip at a bottom edge of the second portion, wherein the lip is configured to hold the device onto the cap of the fire hydrant, wherein the device, including the first portion and the second portion, consists entirely of an elastic flexible material, wherein an elasticity and flexibility of the device is sufficient to allow application and removal of the device on the upper portion of a fire hydrant without use of tools.

2. The device of claim 1, wherein the device is configured to cover all or substantially all of the cap of the fire hydrant.

3. The device of claim 1, wherein the first portion is movably attached and integral to the second portion.

4. The device of claim 1, comprising an open end of the first portion, wherein the device is configured such that a water flow valve of the fire hydrant protrudes at least partially through the open end when the device is in an installed position.

5. The device of claim 1, further comprising an integrated identification component, wherein the integrated identification component is configured to store operational information about the fire hydrant.

6. The device of claim 5, wherein a storage region is formed into the device configured to receive the identification component, and wherein the identification component is configured to store operational information about the fire hydrant and to transmit this operational information to emergency personnel.

7. The device of claim 5, wherein the identification component is configured as an active RFID device for digitally cataloguing and discovering a location of the device using a compatible RFID reader.

8. The device of claim 7, wherein the identification component is in electrical communication with a power source.

9. The device of claim 1, wherein the device comprises one or more predetermined colors associated with an identifying characteristic of the fire hydrant to which it is to be applied.

10. The device of claim 1, wherein the device comprises a reflective material.

11. The device of claim 10, wherein the reflective material comprises a reflective silicone material from which the device is made.

12. The device of claim 1, wherein an elasticity and flexibility of the device is sufficient to allow the device to conform to a shape of the bonnet portion of the fire hydrant.

13. A fire hydrant bonnet cover, the fire hydrant bonnet cover comprising:
   an elastic flexible material component formed in a shape substantially similar to a bonnet portion of a fire hydrant, the elastic flexible material component comprising:
      an upper portion comprising a shape of the bonnet of the fire hydrant; and
      a lower portion defining a cylindrical structure with a lip at a bottom edge of the lower portion, wherein the lip is configured to hold the elastic flexible material component onto the bonnet of the fire hydrant;
      a predetermined color associated with an identifying characteristic of the fire hydrant to which it is to be applied; and
   a reflective material applied to or integrated into the elastic flexible material component,
   wherein the elastic flexible material component, including the upper portion and the lower portion, consists entirely of an elastic flexible material, wherein an elasticity and flexibility of the fire hydrant bonnet cover is sufficient to allow application and removal of the fire hydrant bonnet cover on the upper portion of a fire hydrant without use of tools.

14. The device of claim 13, further comprising an integrated identification component, wherein the integrated identification component is configured to store operational information about the fire hydrant.

15. The fire hydrant bonnet cover of claim 13, wherein an elasticity and flexibility of the fire hydrant bonnet cover is sufficient to allow the fire hydrant bonnet cover to conform to a shape of the bonnet portion of the fire hydrant.

\* \* \* \* \*